US008967485B2

(12) United States Patent
Piazza et al.

(10) Patent No.: US 8,967,485 B2
(45) Date of Patent: Mar. 3, 2015

(54) RECONFIGURABLE ANTENNA SYSTEM FOR RADIO FREQUENCY IDENTIFICATION (RFID)

(75) Inventors: Daniele Piazza, Lodi (IT); Michele D'Amico, Milan (IT)

(73) Assignee: Adant SRL (IT)

( * ) Notice: Subject to any disclaimer, the term of this patent is extended or adjusted under 35 U.S.C. 154(b) by 51 days.

(21) Appl. No.: 13/516,233

(22) PCT Filed: Dec. 16, 2010

(86) PCT No.: PCT/EP2010/007652

§ 371 (c)(1), (2), (4) Date: Jun. 14, 2012

(87) PCT Pub. No.: WO2011/072844

PCT Pub. Date: Jun. 23, 2011

(65) Prior Publication Data

US 2012/0248187 A1 Oct. 4, 2012

Related U.S. Application Data

(60) Provisional application No. 61/286,786, filed on Dec. 16, 2009.

(51) Int. Cl.
*G06K 19/06* (2006.01)
*H01Q 23/00* (2006.01)
(Continued)

(52) U.S. Cl.
CPC ................. *H01Q 23/00* (2013.01); *H01Q 3/00* (2013.01); *H01Q 13/28* (2013.01); *H01Q 15/0006* (2013.01); *H01Q 1/2216* (2013.01); *H01Q 3/01* (2013.01)
USPC .......................................... 235/492; 235/487

(58) Field of Classification Search
USPC .................................................. 235/487, 492
See application file for complete search history.

(56) References Cited

U.S. PATENT DOCUMENTS 5,440,320 A * 8/1995 Lach et al. .................... 343/915
6,633,260 B2 * 10/2003 Paschen et al. ........ 343/700 MS
(Continued)

FOREIGN PATENT DOCUMENTS

DE 20 2006-017474 3/2007
DE 10 2006-053987 3/2008
(Continued)

OTHER PUBLICATIONS

Caloz et al., "Composite right/left-handed transmission line metamaterials", IEEE Microwave Magazine, Sep. 1, 2004, vol. 5, No. 3, 34-50.
(Continued)

*Primary Examiner* — Paultep Savusdiphol
(74) *Attorney, Agent, or Firm* — Baker & Hostetler LLP

(57) ABSTRACT

An antenna system that allows increasing the reading reliability of RFId systems by dynamically changing the shape or the polarization of the electromagnetic field radiated by the RPId reader. The system includes at least one reconfigurable antenna, a variable DC bias unit and a methodology to efficiently use the system in RFId applications. The system allows changing the direction in which the energy is radiated or the polarization of the radiated field in order to "move" the electromagnetic field and to also read RFid tags that receive faint signals with standard RFid systems. Polarization alignment between the reader's antenna and the transponder allows for maximum power transfer, while changing the direction of radiation allows concentrating the electromagnetic field towards the transponder.

10 Claims, 5 Drawing Sheets

(51) Int. Cl.

| | |
|---|---|
| ***H01Q 3/00*** | (2006.01) |
| ***H01Q 13/28*** | (2006.01) |
| ***H01Q 15/00*** | (2006.01) |
| ***H01Q 1/22*** | (2006.01) |
| ***H01Q 3/01*** | (2006.01) |

(56) References Cited

U.S. PATENT DOCUMENTS

| | | | | |
|---|---|---|---|---|
| 7,319,398 | B2 | 1/2008 | Marino | |
| 7,420,518 | B2 | 9/2008 | Boisbouvier et al. | |
| 7,453,363 | B2 * | 11/2008 | Reynolds | 340/572.7 |
| 7,469,152 | B2 * | 12/2008 | Cetiner et al. | 455/562.1 |
| 7,496,329 | B2 | 2/2009 | Patel et al. | |
| 7,576,627 | B2 | 8/2009 | Shastry et al. | |
| 7,580,684 | B2 | 8/2009 | Cyr et al. | |
| 7,592,961 | B2 | 9/2009 | Thober et al. | |
| 7,620,424 | B2 * | 11/2009 | Cetiner et al. | 455/562.1 |
| 7,724,141 | B2 * | 5/2010 | Reynolds | 340/572.7 |
| 2002/0044096 | A1 * | 4/2002 | Chung | 343/742 |
| 2004/0266481 | A1 * | 12/2004 | Patel et al. | 455/558 |
| 2005/0200528 | A1 * | 9/2005 | Carrender et al. | 343/700 MS |
| 2006/0125638 | A1 * | 6/2006 | Marino | 340/572.7 |
| 2006/0222101 | A1 * | 10/2006 | Cetiner et al. | 375/267 |
| 2007/0040687 | A1 * | 2/2007 | Reynolds | 340/572.7 |
| 2007/0040689 | A1 * | 2/2007 | Reynolds | 340/572.7 |
| 2007/0141997 | A1 | 6/2007 | Wulff et al. | |
| 2007/0194929 | A1 | 8/2007 | Wagner et al. | |
| 2008/0072082 | A1 | 3/2008 | Lertora et al. | |
| 2008/0110255 | A1 | 5/2008 | Lertora et al. | |
| 2009/0081965 | A1 * | 3/2009 | Erceg et al. | 455/90.2 |
| 2009/0146816 | A1 | 6/2009 | Patel et al. | |
| 2009/0209212 | A1 * | 8/2009 | Cetiner et al. | 455/90.2 |
| 2010/0060449 | A1 | 3/2010 | Lertora et al. | |
| 2011/0032079 | A1 * | 2/2011 | Bloy et al. | 340/10.1 |

FOREIGN PATENT DOCUMENTS

| | | | |
|---|---|---|---|
| EP | 1610258 | | 12/2005 |
| EP | 1758256 | | 2/2007 |
| EP | 1681582 | | 8/2008 |
| EP | 2202891 | | 6/2010 |
| EP | 2230721 | | 9/2010 |
| FR | 2879355 | A1 | 6/2006 |
| WO | WO 96/31787 | | 10/1996 |
| WO | WO 03/092172 | | 11/2003 |
| WO | WO 2005/043292 | | 5/2005 |
| WO | WO 2006/099552 | | 9/2006 |
| WO | WO 2007/024347 | | 3/2007 |
| WO | WO 2007/024348 | | 3/2007 |
| WO | WO 2007/048052 | | 4/2007 |
| WO | WO 2009/018156 | | 2/2009 |
| WO | WO 2009/086252 | | 7/2009 |
| WO | WO 2010/057263 | | 5/2010 |
| WO | WO 2011/024575 | | 3/2011 |

OTHER PUBLICATIONS

Caloz et al., "Metamaterial-Based Electronically Controlled Transmission-Line Structure as a Novel Leaky-Wave Antenna With Tunable Radiation Angle and Beamwith", IEEE Transactions on Microwave Theory and Techniques, Jan. 1, 2005, 161-173.

Caloz et al., "Transmission line approach of left-handed (LH) materials and microstrip implementation of an artificial LH transmission line", IEEE Transactions on Antennas and Propagation, May 2004, vol. 52, No. 5, 1159-1166.

Hashemi et al., "Electronically Controlled Metamaterial-Based Leaky-Wave Transmission-Line for Conformal Surface Applications", Microwave Symposium Digest, Jun. 7, 2009, 69-72.

Lei et al., "Dominant mode leaky-wave antenna with backfire-to-endfire scanning capability", Electronic Letters, Nov. 2002, vol. 38, 1414-1416.

Piazza et al., "Two port reconfigurable CRLH leaky wave antenna with improved impedance matching and beam tuning", Antennas and Propagation, Mar. 23, 2009, 2046-2049.

Sanada et al., "Characteristics of the composite right/left handed transmission lines", IEEE Microwave and Wireless Components Letters, Feb. 2004, vol. 14, No. 2, 68-70.

* cited by examiner

RECONFIGURABLE ANTENNA SYSTEM FOR RADIO FREQUENCY IDENTIFICATION (RFID)

CROSS REFERENCE TO RELATED APPLICATIONS

This application is a U.S. national stage application of PCT/EP2010/007652, filed on Dec. 16, 2010, which claims priority to U.S. provisional application 61/286,786, filed on Dec. 16, 2009, the entireties of the disclosures of which are incorporated herein.

TECHNICAL FIELD

The present invention relates generally to the field of RFId antenna systems. Specifically, the present invention relates to an antenna system that can be used to improve the reading reliability of RFId systems.

BACKGROUND OF THE INVENTION

Radio-frequency identification (RFId) is an automatic identification method, relying on storing and remotely retrieving data using devices called RFId tags or transponders. The technology requires some extent of cooperation of an RFId reader and an RFId tag. The reading reliability of an RFId system depends mainly on the proper exposure of the RFId tag to the electromagnetic field radiated by the antenna reader. Once the transponder is exposed to the electromagnetic filed radiated by the reader, it collects the necessary power for activation and for sending a response signal to the reader. However in the case of high tag density or when tags are used with non-compliant RFId materials (e.g. liquid, metal) or when they are applied on goods that can not be moved, it is difficult to properly expose the transponder to the radiated electromagnetic field and identify it with standard RFId antenna system.

Reconfigurable RFid antenna networks have been proposed that use a switch matrix including a single pole multiple throw switch, a plurality of reconfigurable antennae, and a controller for controlling the state of the switch matrix. For example, U.S. Pat. No. 7,319,398 discloses such a system where a reader unit uses different antennae located at multiple points within and on shelves for reading RFid tags of items on the shelves.

In other RFid tag reading systems, such as that described in U.S. Pat. No. 7,496,329, a scanning reconfigurable antenna system having phased arrays of variable capacitors or parasitic elements or variable dielectrics is used to scan the RFid tags.

However, such prior art systems are limited in that they do not permit the shape and polarization of the electromagnetic field to be changed so as to concentrate the electromagnetic field towards the transponder to more effectively and efficiently read RFid tags that may otherwise be difficult to read. Moreover, such prior art systems do not allow for efficient power transfer, thereby limiting the range of the antenna systems. The present invention is designed to address these and other needs in the art.

SUMMARY

In order to overcome the aforementioned problems in the art, an antenna system is proposed that allows increasing the reading reliability of RFId systems by changing the shape and/or the polarization of the electromagnetic field radiated by the antennae. By dynamically changing the direction in which the energy is radiated and/or the polarization and/or the shape of the radiated field, the electromagnetic field can be "moved" so as to read tags that receive faint signals with standard RFId systems. Polarization alignment between the reader's antenna and the transponder allows for maximum power transfer, while changing the direction and/or shape of radiation allows concentrating the electromagnetic field towards the transponder.

In accordance with the invention, an RFId system uses reconfigurable antennas capable of changing pattern and/or polarization. In particular, the RFId antenna system of the invention comprises an RFId reader, a reconfigurable antenna connected to the RFId reader and capable of dynamically changing at least the shape or the polarization state of the radiated field. In an exemplary embodiment, the reconfigurable antenna includes a printed circuit board antenna element (e.g., microwave laminate printed circuit board) with integrated RF switches, variable capacitors and/or variable inductors that may be controlled to dynamically change the current distribution on the antenna. The integrated RF switches may include MEMS (Micro Electro Mechanical Systems) switches, PIN diodes, FET (Field Effect Transistor), or variable capacitors (varactor diodes or variable MEMS capacitors). Also, a variable DC bias unit is provided that is electrically connected to the integrated RF switches for controlling the antenna to tune the antenna radiation properties. The variable DC bias unit may be integrated with the reconfigurable antenna. In operation, the variable DC bias unit changes the applied voltage to the integrated RF switches without collecting any information from the reader.

In an exemplary embodiment, a plurality of the reconfigurable antennas are connected to the RFid reader and a processing unit is provided that synchronizes configuration selection for the plurality of reconfigurable antennas. In another embodiment, a detector is provided that collects information on the received signal from the RFid tags and the processing unit processes the collected information to select an antenna configuration for the reconfigurable antenna and to activate the variable DC bias unit to accordingly configure the reconfigurable antenna based at least in part on such collected information. In yet another embodiment, the variable DC bias unit changes the applied voltage to the integrated RF antenna without collecting any information from the RFid reader.

By using pattern and/or polarization reconfigurable antennas, the invention makes it is possible to increase the reading reliability and the ease of installation of RFId systems with respect to current solutions in scenarios like supply chain, warehouse, manufacturing, retail, asset and people tracking, and medical applications.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Exemplary embodiments of the invention will be described in connection with the associated figures, of which.

DETAILED DESCRIPTION OF ILLUSTRATIVE EMBODIMENTS

Figure 1:
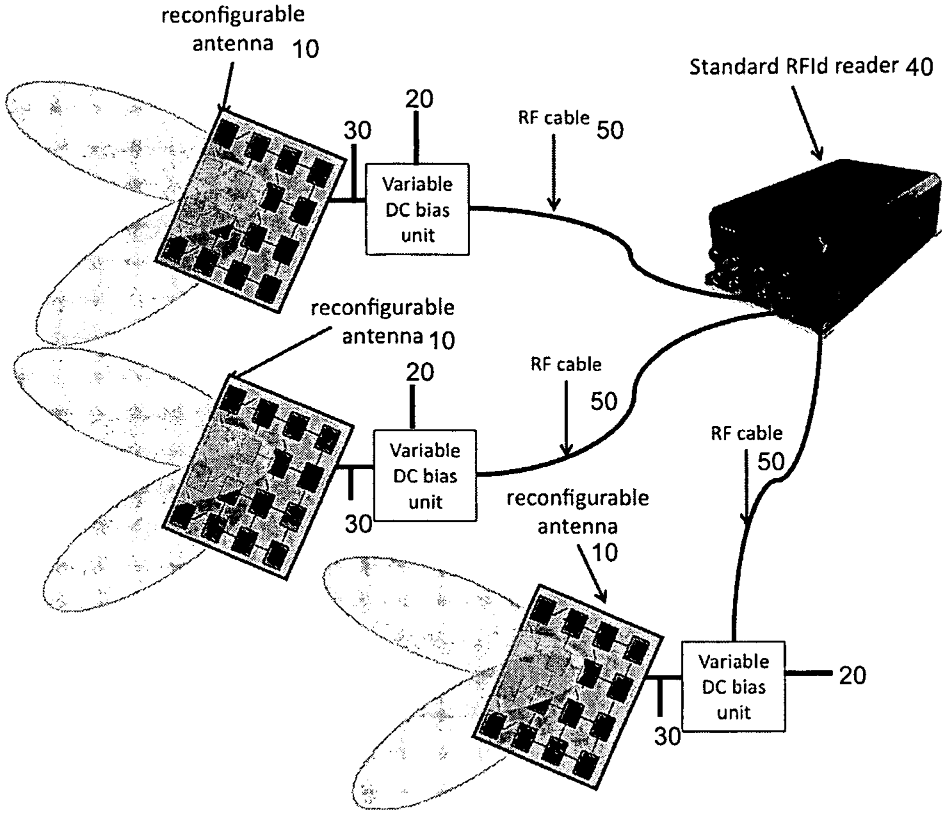
FIG. 1 is a schematic of the proposed reconfigurable antenna system for RFId in accordance with the invention.

A detailed description of illustrative embodiments of the present invention will now be described with reference to FIGS. 1-9. Although this description provides a detailed example of possible implementations of the present invention, it should be noted that these details are intended to be exemplary and in no way delimit the scope of the invention.

Current antenna solutions employed with RFId readers are not reconfigurable and typically radiate the energy statically with radiation patterns with fixed shape and polarization. In case of high tag density or when tags are used with non-compliant RFId materials (e.g. liquid, metal) or when they are applied on goods that can not be moved, it is difficult to properly expose the transponder to the radiated electromagnetic field with standard RFId antenna systems. In accordance with the invention, it is desired to dynamically change the direction in which the energy is radiated or the polarization of the radiated field so that the electromagnetic field can be "moved" to enable the antenna system to read those tags that receive faint signals in standard RFId systems. As will be explained below, polarization alignment between the reader's antenna and the transponder allows for maximum power transfer, while changing the direction of radiation allows concentrating the electromagnetic field towards the transponder.

Adaptive antenna systems that can reconfigure the shape or the polarization of the radiated field in RFId systems have been proposed in the prior art. However, these systems employ multiple antennas and variable phase shifters to change the phase excitation of each array element to achieve dynamic beam tuning. Other solutions employ digital beamforming with multiple antennas in order to change the direction in which the energy is radiated. Moreover, the prior art antenna systems that employ adaptive antenna systems for RFId require control circuitry that drives the RFId antenna system based on some information that is collected by the RFId reader and properly post processed.

The present invention improves upon such antenna systems by providing a specific antenna technology and a variable DC bias unit that allows continuous changing of the state of polarization and the direction of radiation. A switching system is integrated on the antenna to dynamically change the current distribution on the antenna. As opposed to prior art antenna systems in which multiple antennas are used to change the direction in which the energy is radiated, in accordance with the invention MEMS (Micro Electro Mechanical Systems) switches, PIN diodes, FET (Field Effect Transistor) or variable capacitors (varactor diodes or variable MEMS capacitor) are mounted on the antenna to implement the switching system. In order to effectively use these reconfigurable antennas in standard RFId systems, one or multiple variable DC bias units are also employed to drive the switching network and to continuously change the polarization state and the direction of radiation.

Unlike other adaptive antenna systems for RFId, the invention may include a single antenna structure and does not necessarily require an array of antennas. Depending on the specific implementation, the antenna system of the invention may not require collecting any information from the reader to control the antenna radiation property.

In addition, each variable DC power supply or bias unit is used to continuously change the voltage applied to each switching system (MEMS switches, PIN diodes, FET or variable capacitors (varactor diodes or variable MEMS capacitor)) mounted on the antenna structure. The variable voltage applied to the antenna system can be changed in discrete steps or continuously depending on the type of variable DC power supply employed. In this way, the antenna radiation properties are continuously changed without the need for collecting and processing any information relative to the RFId system. The antennas connected to the RFId reader continuously change their radiation properties while the reader interrogates all the RFId tags in the system.

Figure 2:
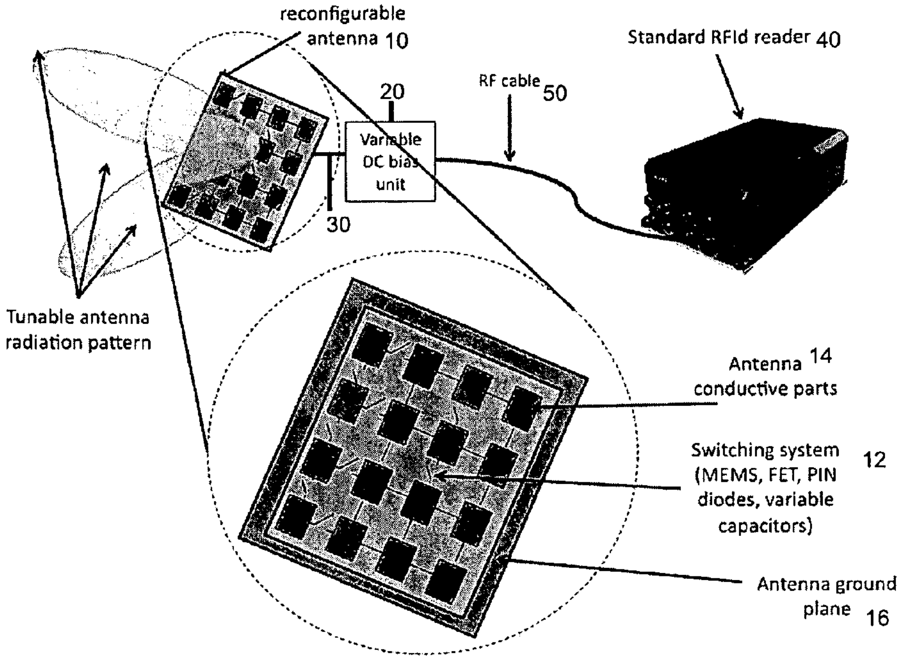
FIG. 2 is a schematic of the proposed reconfigurable antenna system for RFId of FIG. 1 with a blown up view of the antenna components.
Figure 3:
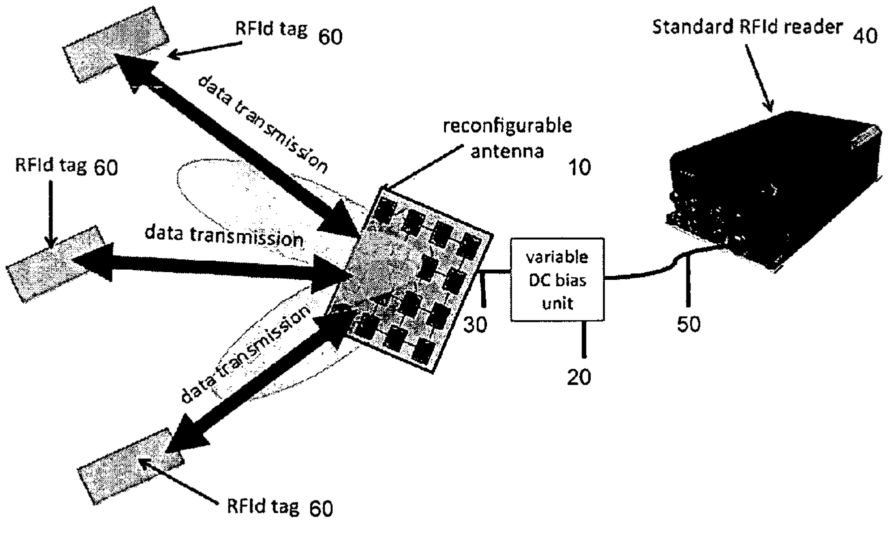
FIG. 3 is a schematic of the proposed reconfigurable antenna system for RFId illustrating the cooperation between the RFId interrogator system and the RFId tags.

Such an RFId antenna system now will be described below with respect to FIGS. 1-3. As illustrated in FIGS. 1-3, an exemplary embodiment of the adaptive RFId system of the invention includes one or more reconfigurable antennas 10 that each includes any antenna type equipped with a switching system 12 (MEMS switches, PIN diodes, FET or variable capacitors (varactor diodes or variable MEMS capacitor)) used to change the electrical properties of the antenna to generated tunable antenna radiation patterns. As best illustrated in FIG. 2, the antennas 10 each include conductive parts 14 mounted on a ground plane 16 and selectively connected to each other by the switching system 12. In an exemplary embodiment, the antennas 10 are fabricated on microwave laminate printed circuit boards. Preferably, the reconfigurable antennas 10 are of the type described in U.S. Provisional Patent Application No. 61/286,786, from which the present application claims priority and of which the contents are incorporated herein by reference. One or multiple variable DC power supplies 20 are electrically connected to the antennas 10 and used to change the applied voltage to the antennas 10 to tune the antenna radiation properties. As used herein, a variable DC bias unit is a circuit capable of generating different levels of DC voltage and/or currents. As illustrated, connection between the variable DC bias unit 20 and the switching system on the antenna 10 can be achieved through cables or metallic connections or other means 30. The RFid system also includes an RFId reader 40 connected to one or multiple of the antenna systems 10 by means of an RF cable or any other type of connection 50 capable of generating a radio frequency connection between the RFId interrogator 40 and the antenna 10. As illustrated in FIG. 3, the tunable antenna radiation patterns provide interrogation signals to RFId tags 60 that, in turn, communicate with the RFId interrogators to provide data transmission of the information stored in the RFid tags 60.

Figure 4:
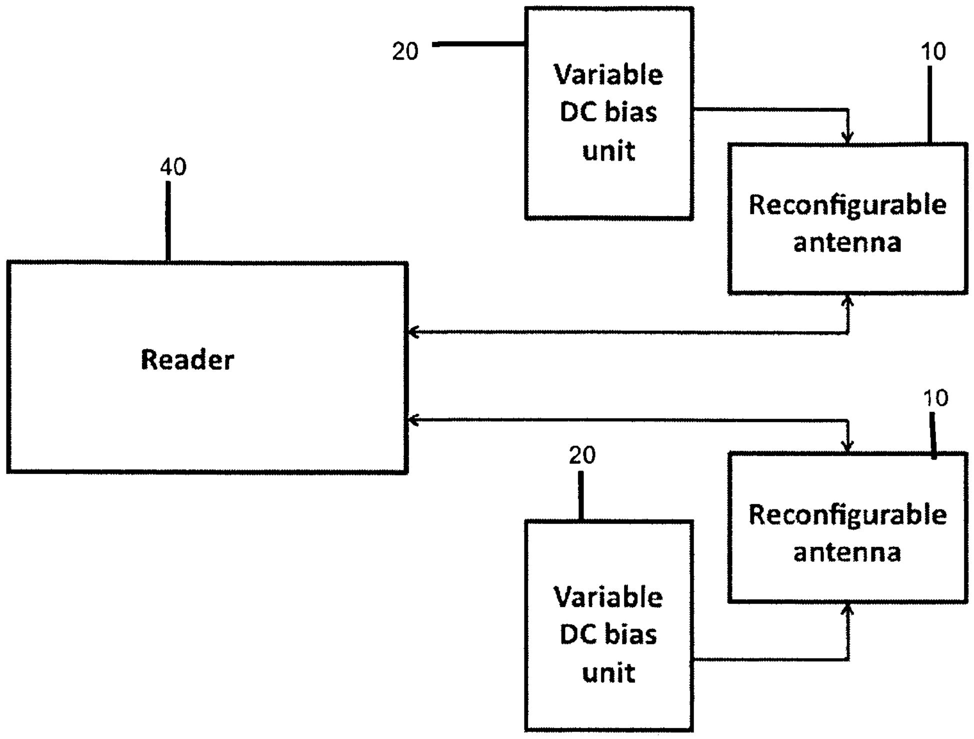
FIG. 4 illustrates an embodiment of an RFId system equipped with reconfigurable antennas where no feedback is provided from the reader to the antenna and no processing unit is used.

FIG. 4 illustrates an embodiment of an RFId system equipped with reconfigurable antennas where no feedback is provided from the reader to the antenna and no processing unit is used. In this embodiment, the interrogator (reader) 40 sends one or multiple signals to the RFId tags 60 through the reconfigurable antenna system 10. The RFId tags 60 respond to the interrogator 40 through a data communications signal. The voltage applied to the antennas by means of variable DC power supplies 20 is continuously changed in order to continuously tune the radiation characteristics of the antennas 10 while the reader 40 interrogates the RFId tags 60. The applied voltage is continuously varied in a finite voltage range that depends on the switching system employed on the antenna 10.

Figure 5:
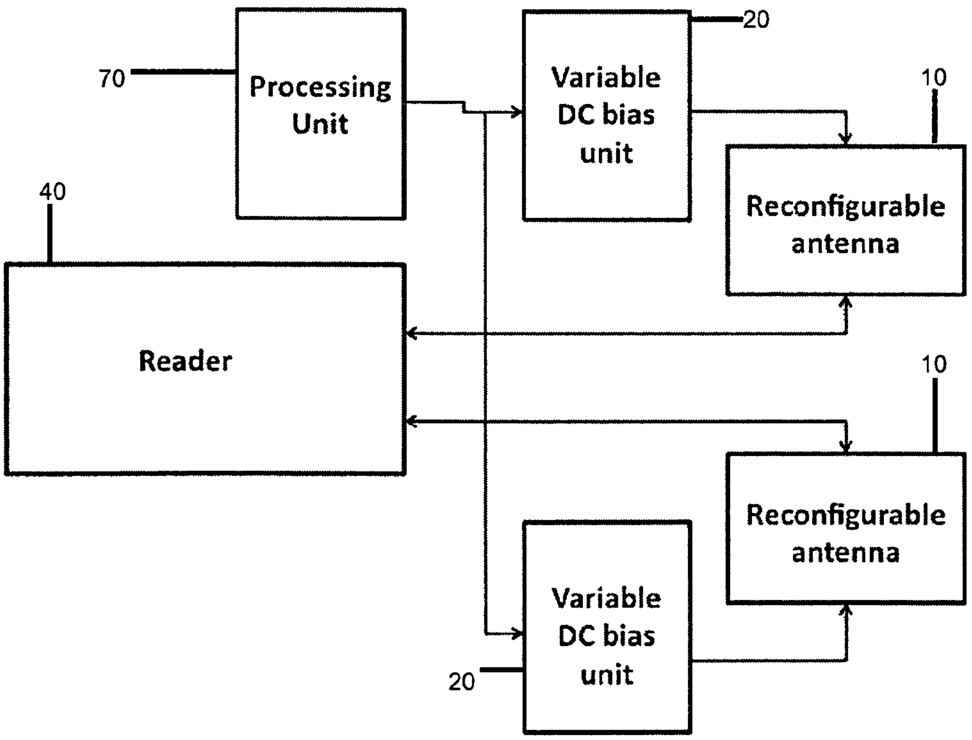
FIG. 5 illustrates an embodiment of an RFId system equipped with reconfigurable antennas where no feedback is provided from the reader to the antenna but an external processing unit controls all the antennas simultaneously.

FIG. 5 illustrates an embodiment of an RFId system equipped with reconfigurable antennas where no feedback is provided from the reader to the antenna but an external processing unit controls all the antennas simultaneously. This embodiment is similar to the embodiment of FIG. 4 except that a processing unit 70 is provided to control all of the variable DC power supplies in order to effectively select the configuration for each of the antennas connected to the reader 40.

In the embodiment of FIG. 5, the interrogator (reader) 40 sends one or multiple signals to the RFId tags 60 through the reconfigurable antenna system 10. The RFId tags 60 respond to the interrogator 40 through a data communications signal. The voltage applied to the antennas by means of variable DC power supplies 20 is changed according to an algorithm that runs on the processing unit 70 in order to continuously tune the radiation characteristics of the antennas 10 while the reader interrogates the RFId tags 60. A suitable algorithm for these purposes is dependent upon the characteristics preferred by the system designer and is within the level of skill of those skilled in the art.

Figure 6:
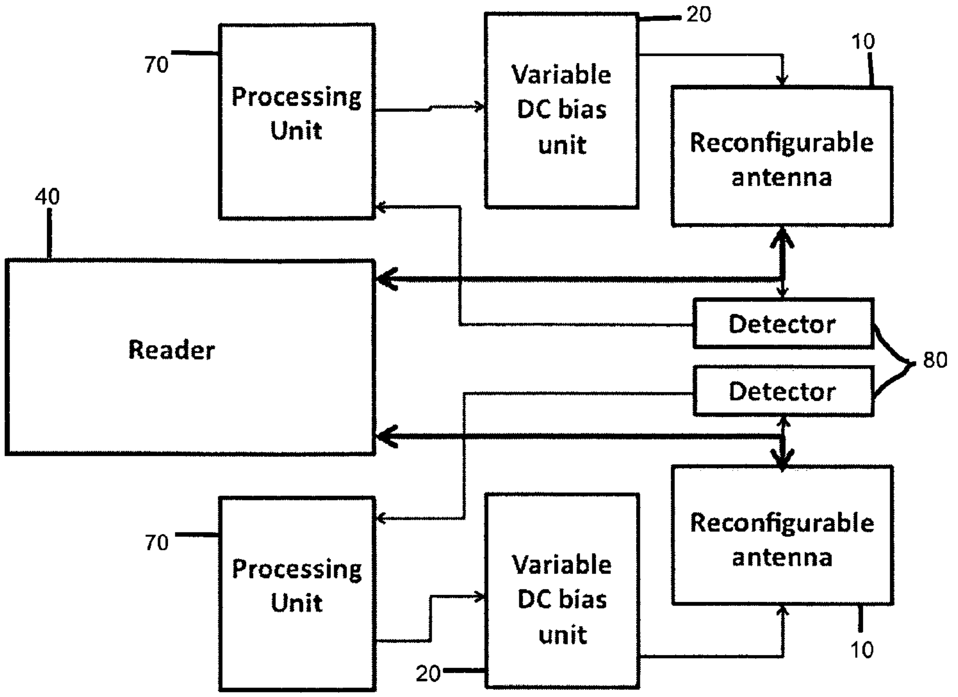
FIG. 6 illustrates an embodiment of an RFId system equipped with reconfigurable antennas where no feedback is provided from the reader to the antenna and where each antenna is equipped with one or more detectors used to collect information on the received signal (e.g. signal strength) to provide to the reader and a processing unit that uses this information to set the antenna configuration.

FIG. 6 illustrates an embodiment of an RFId system equipped with reconfigurable antennas where no feedback is provided from the reader to the antenna and where each antenna is equipped with one or more detectors used to collect information on the received signal (e.g. signal strength) to provide to the reader and a processing unit that uses this information to set the antenna configuration. This embodiment is similar to the embodiment of FIG. 5 except that each antenna 10 is equipped with one or more detectors 80 used to collect information on the received signal from the RFid tags 60 (e.g. signal strength). A processing unit 70 associated with each antenna 10 uses this information to select the antenna configuration to apply to the antenna system 10 through the variable DC power supplies 20.

In the embodiment of FIG. 6, the interrogator (reader) 40 sends one or multiple signals to the RFId tags 60 through the reconfigurable antenna system 10. The RFId tags 60 respond to the interrogator 40 through a data communications signal. One or multiple detectors 80 placed on each antenna 10 collect some information on the received signal per antenna (e.g. received signal strength). The information collected by the detectors 80 is used by a processing unit 70 to select the antenna configuration for each of the antennas 10 connected to the reader 40. The processing unit 70 controls the variable DC power supplies 20 used to change the radiation characteristics of each antenna system 10. Though a separate processing unit 70 is illustrated in FIG. 6 for use with each antenna system 10, those skilled in the art will appreciate that one processing unit 70 may be programmed to change the radiation characteristics of two or more antenna systems 10.

Figure 7:
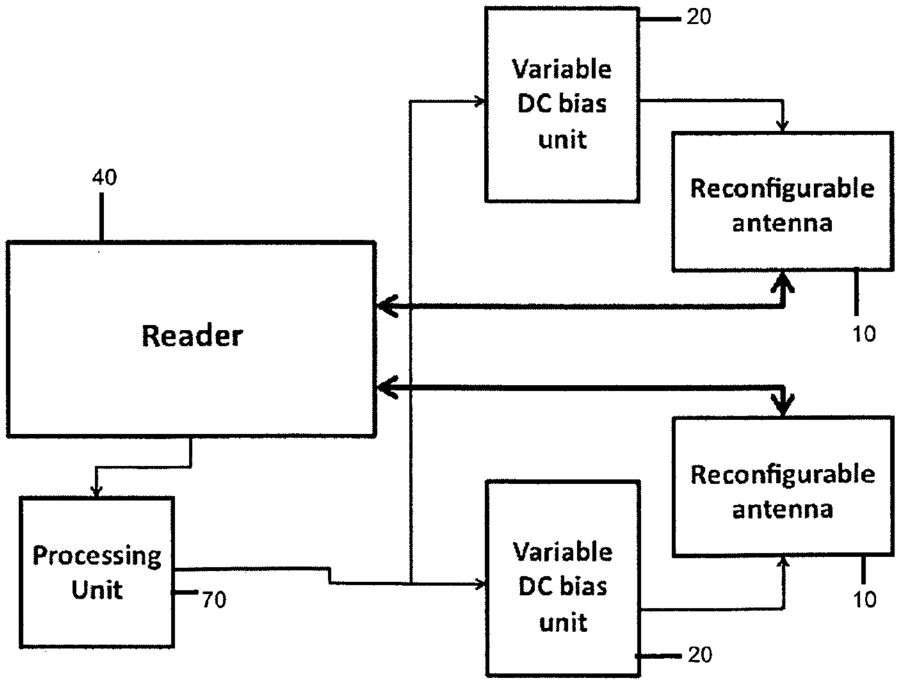
FIG. 7 illustrates an embodiment of an RFId system equipped with reconfigurable antennas where feedback is provided from the antennas to the reader and an external processing unit controls all the antennas simultaneously.

FIG. 7 illustrates an embodiment of an RFId system equipped with reconfigurable antennas where feedback is provided from the antennas to the reader and an external processing unit controls all the antennas simultaneously. This embodiment is similar to the embodiment of FIG. 5 except a processing unit 70 (internal or external to the RFId reader 40) receives feedback information (e.g. received signal strength per antenna, number of tags identified per antenna, reading rate per antenna) from the RFId reader 40 and selects which antenna configuration to use based on such information and accordingly controls the radiation characteristics of the respective antenna systems 10.

In the embodiment of FIG. 7, the interrogator (reader) 40 sends one or multiple signals to the RFId tags 60 through the reconfigurable antenna system 10. The RFId tags 60 respond to the interrogator 40 through a data communications signal. Feedback information from the antenna systems 10 (e.g. received signal strength per antenna, number of tags identified per antenna, reading rate per antenna) is provided from the reader 40 to a processing unit 70 (internal or external to the interrogator 40) that evaluates such information and sets the configurations to be used for one or more (or all) of the antenna systems 10 connected to the reader 40. The processing unit 70 is accordingly programmed to control the variable DC power supplies 20 to change the radiation characteristics of each antenna system 10.

Figure 8:
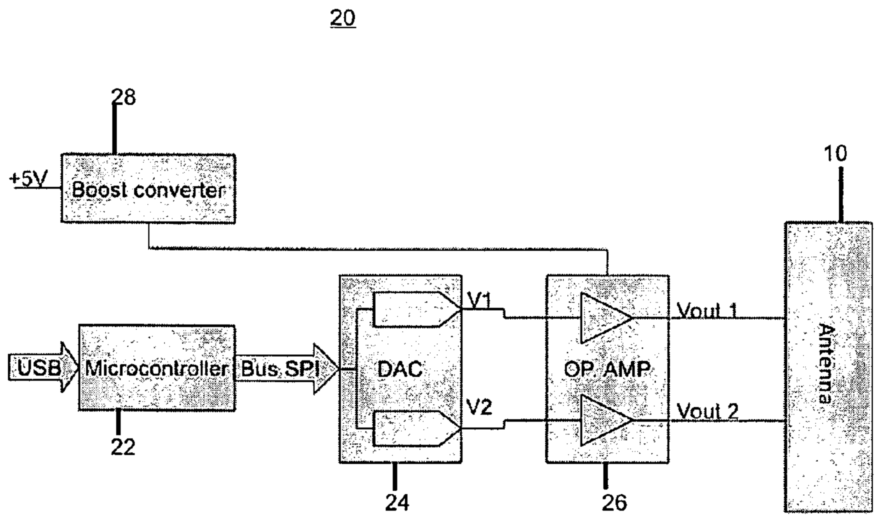
FIG. 8 is a block diagram of a variable DC power supply used to power the reconfigurable antennas in an embodiment of the invention.

The reconfigurable RFId system illustrated in FIGS. 1-7 can be used with a DC bias control unit of the type illustrated in FIG. 8 to allow setting the frequency used for changing the antenna configuration and the antenna configurations to loop through. In particular, FIG. 8 is a block diagram of an embodiment of a variable DC power supply 20 used to power the reconfigurable antennas 10 in an exemplary embodiment of the invention. The variable DC power supply of FIG. 8 may include one or multiple DC biases that are used to provide power to the active components used for a variable DC power supply. As illustrated in FIG. 8, a programmable microprocessor (microcontroller) 22 is used to provide a set of bits that define the desired voltage configuration over a bus to one or multiple digital to analog converters (DAC) 24 are used to convert the set of bits into an analog signal for application to operational amplifiers 26 that use the analog signal to generate the desired output voltage(s) (Vout1, Vout2) using a voltage output from boost converter 28 to provide control input for the reconfigurable antennas 10. IN the embodiment of FIG. 8, the variable DC power supply 20 can have one or multiple voltage or current channels (e.g., Vout1, Vout2). The microprocessor 22 can loop through a programmed set of voltages while it allows changing of the switching frequency.

Figure 9:
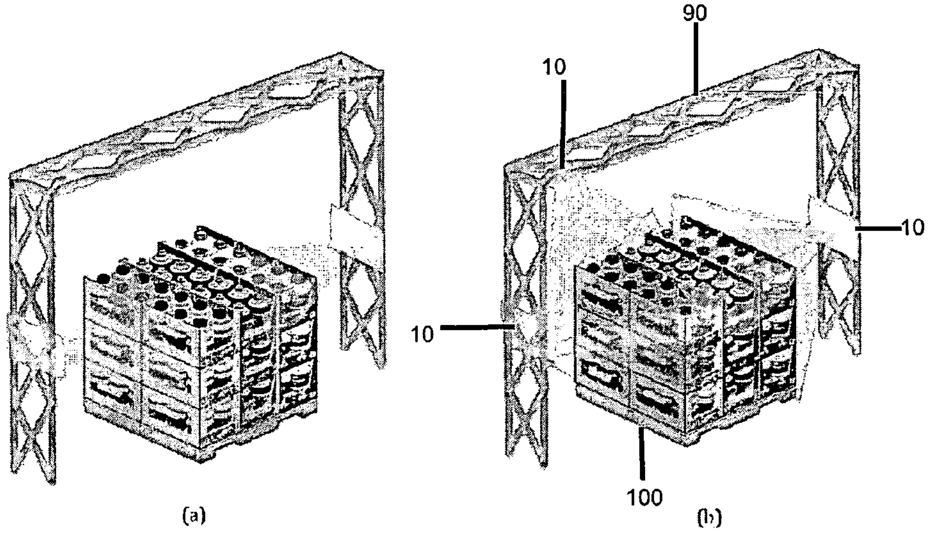
FIG. 9 illustrates an example of electromagnetic field coverage in a warehouse scenario using (a) standard RFid antenna systems and (b) the reconfigurable antenna system of the invention.

The antenna system described herein can be used with standard RFId systems and applied to different scenarios like supply chain, warehouse, manufacturing, retail, asset and people tracking and medical applications. In particular, the invention is particularly suitable for tracking items in harsh environments such as where there are metals, liquids or high tag densities. A specific application of this invention is item tracking for the incoming and outgoing goods in a warehouse as shown in FIG. 9. FIG. 9 illustrates an example of electromagnetic field coverage in a warehouse scenario using (a) standard RFid antenna systems and (b) the reconfigurable antenna system of the invention. As shown, the reconfigurable antennas 10 are mounted on a gate 90 and controlled so as to continuously change the polarization state and radiation pattern shape in order to better expose the RFId tags in the pallet 100 to a strong electromagnetic field while the pallet 100 passes through the gate 90. The antenna system of the invention also can be used with the same working principle in other scenarios to properly expose the RFId tags to a strong electromagnetic field.

While the invention has been described with reference to specific embodiments, the description is illustrative of the invention and is not to be construed as limiting the invention. Various modification and applications may occur to those skilled in the art without departing from the spirit and scope of the invention as defined by the appended claims.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

What is claimed:

1. An RFid antenna system comprising:

an RFid reader adapted to read RFid tags;

at least one reconfigurable antenna connected to said RFid reader and capable of dynamically changing at least the shape and/or the polarization state of the radiated field, said reconfigurable antenna comprising multiple conductive parts connected to each other by means of RF switches, variable capacitors and/or variable inductors that may be controlled to dynamically change the current distribution on the antenna so as to change at least the shape and/or polarization state of the radiated field adapted to provide interrogation signals to said RFid tags; and at least one variable DC bias unit electrically connected to the RF switches, the variable capacitors, and/or the variable inductors for controlling the antenna to tune the antenna radiation properties so as to align the reconfigurable antenna with one or more RFid tags to be interrogated.

2. The system of claim 1 further comprising at least one detector configured to collect information on a received signal from the RFid reader and a processing unit configured to process the collected information to select an antenna configuration for the reconfigurable antenna and to activate the variable DC bias unit to accordingly configure the reconfigurable antenna based at least in part on such collected information.

3. The system of claim 2 further comprising a plurality of said reconfigurable antennas connected to said RFid reader and said processing unit is configured to synchronize configuration selection for said plurality of reconfigurable antennas.

4. The system of claim 1 further comprising a plurality of said reconfigurable antennas connected to said RFid reader and a processing unit configured to collect information directly from the RFid reader, process such collected information and select the antenna configuration and properly activate the variable DC bias unit based at least in part on such collected information.

5. The system of claim 4 wherein the processing unit is further configured to synchronize the configuration selection for all the reconfigurable antennas connected to the RFid reader.

6. The system of claim 1, wherein the variable DC bias unit is integrated with the reconfigurable antenna.

7. The system of claim 1, wherein the RF switches comprise MEMS (Micro Electro Mechanical Systems) switches, PIN diodes, FET (Field Effect Transistor), or variable capacitors.

8. The system of claim 7 wherein the variable capacitors comprise varactor diodes or variable MEMS capacitors.

9. The system of claim 1, wherein the RF switches, variable capacitors and/or variable inductors are mounted on a microwave laminate printed circuit board.

10. The system of claim 1, wherein the variable DC bias unit changes the applied voltage to the RF switches, variable capacitors, and/or variable inductors without collecting any information from the RFid reader.

* * * * *